Apr. 24, 1923.
T. B. JENKINS
1,452,973
SHOCK ABSORBER SPRING
Filed Aug. 3, 1922
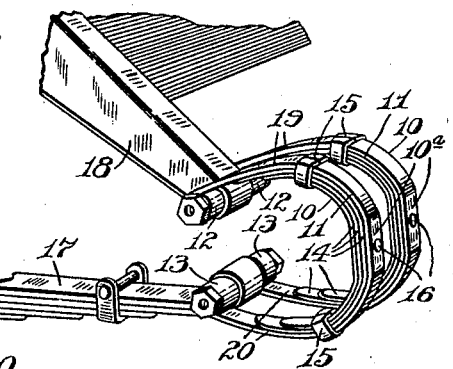
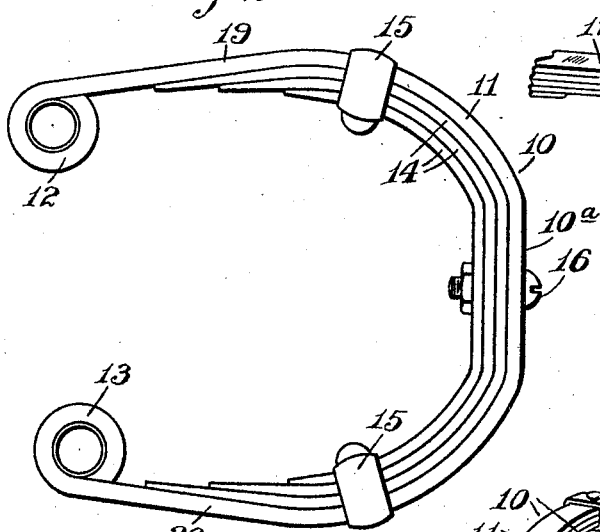
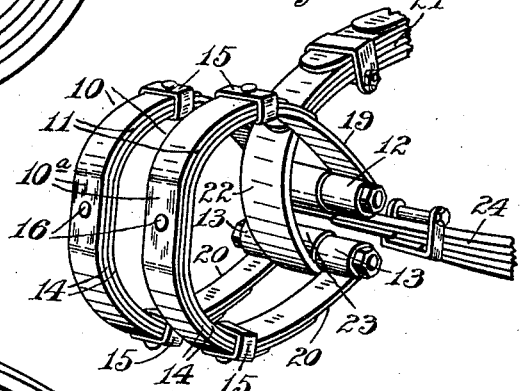
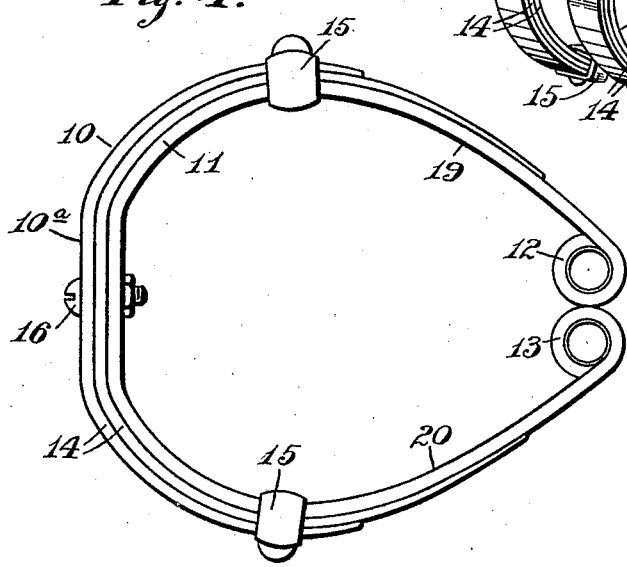
INVENTOR
Thomas B. Jenkins,
BY
Arthur M. Hood.
ATTORNEY Patented Apr. 24, 1923.

1,452,973

UNITED STATES PATENT OFFICE.

THOMAS B. JENKINS, OF RICHMOND, INDIANA, ASSIGNOR TO JENKINS VULCAN SPRING COMPANY, OF RICHMOND, INDIANA, A CORPORATION OF INDIANA.

SHOCK-ABSORBER SPRING.

Application filed August 3, 1922. Serial No. 579,344.

*To all whom it may concern:*

Be it known that I, THOMAS B. JENKINS, a citizen of the United States, residing at Richmond, in the county of Wayne and State of Indiana, have invented a new and useful Shock-Absorber Spring, of which the following is a specification.

My invention relates to improvements in shock absorbers for automobiles and has particular reference to shock absorbing springs adapted to be connected to the body springs of an automobile.

One of the objects of my invention is to provide a shock absorbing leaf spring arranged to be connected to the ends of the body springs of an automobile and so shaped as to evenly distribute the strain throughout the spring.

Other objects and advantages of my invention will more fully appear hereafter.

For the purpose of disclosing my invention, I have illustrated certain embodiments thereof in the accompanying drawing, in which Fig. 1 is a perspective view showing an application of one embodiment of my invention;

Fig. 2 is a side elevation of the form of shock absorbing spring illustrated in Fig. 1;

Fig. 3 is a detailed perspective illustrating an application of an embodiment of my invention; and Fig. 4 is a side elevation of the spring illustrated in Fig. 3.

In the embodiment illustrated in Figs. 1 and 2, the shock absorbing spring 10 is preferably of the leaf-type bent to C spring formation, and comprises a main leaf 11 having eyes 12 and 13 at its ends and a plurality of supplemental leaves 14, substantially of the same formation as the main leaf, and associated with the main leaf in the usual manner by clips 15 and a center bolt 16.

As illustrated in Fig. 1, I prefer to arrange the spring 10 in pairs upon the opposite sides of the body springs 17 of an automobile, one end of the springs being connected to the end of the body springs by means of the usual type of shackle bolt, which, in the present instance, however, is elongated to accommodate the two springs. The opposite ends of the pair of springs 10 are connected to the frame 18 of of automobile body.

I have found that with the ordinary type of C-spring used in the manner as illustrated in Fig. 1, and particularly with the Hotchkiss drive type of automobiles, there is a tendency on the part of said spring to break at what I term the apex of the spring, that is, at the center point of the C or at the point where, in the ordinary type of C-spring, the bolt 16 would pass through the leaves of the spring to hold them together. This is partially due to the fact that the holes tend to weaken the spring at this point. However, I have found that even though bolt holes are not provided at this point, there is a tendency on the part of the spring to break. This is attributable to the fact that the stress on the spring is concentrated at a single point, namely the apex of the spring.

In order to overcome this objection, I have flattened a portion $10^a$ of the spring intermediate of its ends, which flattened portion extends from the apex to a point beyond the apex on either side thereof. In actual practice, this flattened portion is approximately between one-seventh and one-eighth of the entire length of the spring, although I do not wish to confine myself to these specific dimensions.

Due to the flattening or straightening of this portion of the C-spring, I have found that the strain is more equably distributed throughout the entire length of the spring, and as a result, the life of the spring is increased, materially as well as its resilient qualities.

In the spring illustrated in Figs. 1 and 2, I have shown a compression type of spring and in such a structure, when used as a shock absorber for automobiles, I have found there is a tendency on the part of the body spring when responding to shocks and when under compression, to lengthen while the frame of the car being rigid remains stationary. To accommodate this movement, I have found that by shortening the lower end of the spring, as illustrated, a more correct balance of action and position of the spring is obtained when used as above described. Therefore, in the structure illustrated in Figs. 1 and 2, the portion 19 is slightly longer than the portion 20.

In Figs. 3 and 4, I have illustrated another form of spring which is of the expansion type of spring. The shape of the spring 10 is substantially the same as that of the spring illustrated in Fig. 2 with the exception that the two legs or ends 19 and 20 of the spring are of substantially the same length. This type of spring is particularly used in connection with that type of automobile provided with overhanging scroll type of upper, rear body springs. As illustrated in Fig. 3, there is provided an upper, rear body spring 21 having an overhanging scroll 22. The bottom end or leg of the type of spring illustrated in Fig. 4 is adapted to be connected, by means of a shackle bolt passing through the eye 13 and an eye 23 on the spring 21, with this spring 21.

The opposite end of the spring 10 is connected to the lower body spring 24. As illustrated, I preferably use a pair of springs 10 which are disposed on either side of the body spring 21. In this type of mounting, the spring 10 becomes an expansion spring instead of being of the compression type as illustrated in Fig. 1. The structure of this spring, especially in so far as the flattening of the back of the spring or flattening of that portion of the spring extending on either side of the apex is concerned, is the same as the structure illustrated in Figs. 1 and 2.

I claim as my invention:

1. The combination with the body springs of a vehicle, of a pair of supplemental C-springs connected at their ends to the ends of the respective body springs of the vehicle, and having a portion of the back thereof flattened.

2. The combination with the body springs of a vehicle, of a pair of supplemental C-springs connected at their ends to the respective ends of the body springs, and having a substantially straight portion extending beyond and on either side of the apex of the C-spring.

3. As an article of manufacture, a shock absorber spring comprising a C-shaped leaf spring having a portion of its back flattened, and provided at its ends with eyes for the reception of shackle pins of a vehicle spring.

4. As an article of manufacture, a shock absorber spring comprising a C-shaped leaf spring having its back flattened and having one of its legs longer than the other, the ends of said spring being provided with eyes for the reception of shackle pins of a vehicle spring.

5. A shock absorbing spring comprising a C-shaped spring formed of a plurality of C-shaped leaves secured together by means of a bolt passing through said spring at the apex thereof, a portion of said spring at the point where the bolt passes therethrough and on either side thereof being flattened, the ends of said spring being provided with eyes for the reception of shackle pins for securing the same in position on an automobile.

6. A shock absorbing spring comprising a C-spring formed of a multiplicity of leaves and having eyes at the ends thereof for the reception of shackle pins of a vehicle spring, a portion of said C-spring intermediate of its end being substantially straight, the remaining portion of the spring being curved to form, on the whole, a C-shaped spring.

7. A shock absorbing spring for automobiles of the C-type, comprising a multiplicity of leaves suitably secured together, said leaves having a substantially flat base and curved legs, the ends of said legs being provided with eyes for the reception of shackle pins of a vehicle spring.

In witness whereof, I have hereunto set my hand at Richmond, Indiana, this 31st day of July, A. D. one thousand nine hundred and twenty two.

THOMAS B. JENKINS.